Dec. 11, 1962    J. BOLSEY    3,067,530
PROJECTION SCREEN ADAPTED TO HAVE WRITING APPLIED THERETO
Filed Dec. 23, 1959    2 Sheets-Sheet 1

INVENTOR.
JACQUES BOLSEY
BY
Michael J. Striker
ATTORNEYS

Dec. 11, 1962 J. BOLSEY 3,067,530
PROJECTION SCREEN ADAPTED TO HAVE WRITING APPLIED THERETO
Filed Dec. 23, 1959 2 Sheets-Sheet 2

INVENTOR.
JACQUES BOLSEY
BY
Michael S. Striker
ATTORNEYS

United States Patent Office 3,067,530
Patented Dec. 11, 1962

3,067,530
PROJECTION SCREEN ADAPTED TO HAVE
WRITING APPLIED THERETO
Jacques Bolsey, 36 Beechwood Road, Hartsdale, N.Y.
Filed Dec. 23, 1959, Ser. No. 861,523
19 Claims. (Cl. 35—66)

This invention relates in general to projection screens and in particular to a combination projection screen and writing board including heating means for erasing writing made by a heat soluble writing instrument.

In present day teaching methods, it has been found desirable to employ projection apparatus in the demonstration and explanation of certain phenomena. The present invention is designed for use in conjunction with such projection wherein problems of certain factual situations are presented to the students by projection onto a screen and the student is to indicate certain reactions and results directly on the screen which receives the projected image. Heretofore, projection equipment has been used to a limited extent in the teaching process, but it was difficult to obtain any concrete indication of the effect of such educational systems on the students.

In accordance with the present invention there is provided a novel projecting screen which includes a highly reflective surface on which one may write by means of a pencil, brush or marker using a heat soluble writing material. The projecting screen advantageously includes a heatable area to enable one to erase his written indications from the screen by melting the heat soluble material and allowing it to flow off the screen surface into a collecting trough beneath the screen, for example. Thus, the instructor may project an image problem onto the screen and the student may indicate his answer to the problem with a low temperature melting pencil and the indicated answer may thereafter be rapidly and automatically erased after it has been approved by the instructor. The screen may advantageously include projection and/or writing surfaces on one or both sides.

Accordingly, it is an object of this invention to provide a combination projector screen and writing board.

A further object of the invention is to provide a projector screen having a surface adaptable for writing thereon and including means for heating the screen for erasing heat soluble writing indications from the face of the screen.

A further object of the invention is to provide a projector screen including a highly reflective surface and a heating element arranged within the screen to effect removal by heating of any heat soluble writing material from the surface.

A further object is to provide a projector screen having a reflective writing surface and including means for heating this surface.

A further object of the invention is to provide a projection screen which is simple in design, rugged in construction and economical to manufacture.

The various features of novelty which characterize the invention are pointed out with particularity in the claims annexed to and forming a part of this specification. For a better understanding of the invention, its operating advantages and specific objects obtained by its use, reference should be had to the accompanying drawings and descriptive matter in which there are illustrated and described preferred embodiments of the invention.

Figure 1:
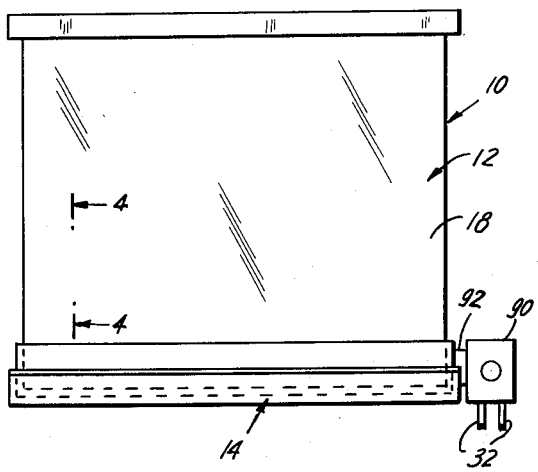
FIG. 1 is a front elevation of a combination projection screen and writing board constructed in accordance with the invention.
Figure 2:
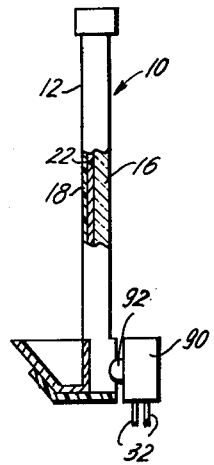
FIG. 2 is a side elevation of the projector screen indicated in FIG. 1.
Figure 3:
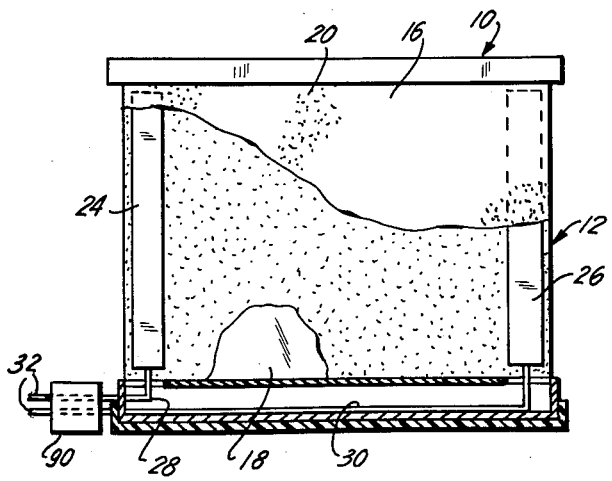
FIG. 3 is a fragmentary rear elevation with portions broken away of the combination writing board and projector screen indicated in FIG. 1.
Figure 4:
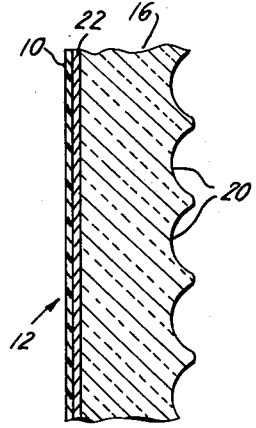
FIG. 4 is an enlarged fragmentary vertical section taken on the line 4—4 of FIG. 1.

Referring to the drawings in particular, the invention as embodied therein includes a combination projection screen and writing board generally designated 10 including a laminated projection screen portion generally designated 12 and a trough portion generally designated 14. The trough 14 is advantageously made of a material such as cardboard to permit it to be discarded after use.

The screen portion 12, in the simplest form, includes a member 16 advantageously made of glass or heat resistant plastic and having a substantially flat outer front face upon which a person, such as a student, may write freely. Said outer face thereof is advantageously coated with a material such as a silicone 18 in order to insure that grease and similar heat soluble materials of the writing instrument will not adhere thereto.

The opposite face of the member 16 includes a plurality of adjacent hemi-spherical recesses having a reflective coating 20 thereon. In between the silicone coating 18 and the member 16 there is applied a coating of semi-conductive material 22. This material 22 is applied to a constituency which will insure that the screen 12 is fully transparent from the front face (or whichever face is chosen for projection) through the member 16 and to the reflective inner surface of the coating 20 on the back surface of the member 16. The hemi-spherical portions are very small in size and present a smooth enough surface for coating or projecting on this rear side, if desired.

The conductive coating is electrically energized through conductive strip members 24 and 26 which extend substantially the entire height of the screen 12 and are connected by wires 28 and 30 to an external cord 32.

Figure 5:
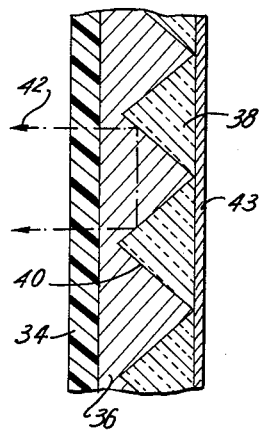
FIGS. 5 to 10 are fragmentary vertical sections similar to FIG. 4 of other embodiments of the invention.

In the embodiment indicated in FIG. 5, there is provided an outer layer 34 made of a glass or plastic material permitting it to be written upon with an indicating instrument, such as a grease pencil. A conductive coating 36 is then applied between this face 34 and a prismatic member 38 which includes a plurality of cross rows of reflective prisms 40 arranged to reflect light as indicated by the light ray pattern 42. A light reflective sheet of material 43 is located at the right face of member 38, as viewed in FIG. 5.

Figure 6:
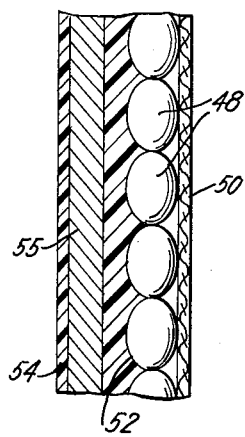

In the embodiment illustrated in FIG. 6, a reflective surface 44 is provided which includes a multiplicity of interconnected light transmissive bead members 48 which are held together on a light reflective piece of material, such as white fabric 50. The outer surfaces of the beads 48 are covered with a semi-conductive material 52 and a silicone coating 54 as in the previous embodiments. If desired, the conductive coating 52 may be covered with a heat resistant material, such as glass or heat resistant plastic 55, and the silicone coating 54 may be placed on the outer surface of this material.

Figure 7:
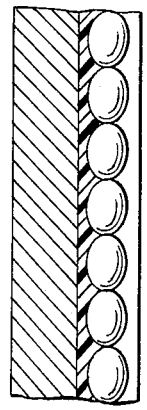

FIGS. 7 through 10 show other modifications of the present screen construction. In FIG. 7, for example, glass beads 56, similar to the beads 48, are mounted on a supporting surface 58 which is provided with a heat conducting coating 60 between the beads and the supporting surface.

Figure 8:
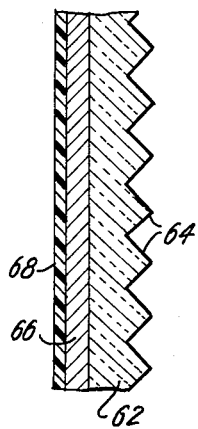

A variation of the embodiment indicated in FIG. 5 is shown in FIG. 8 in which the optical light director member 62 is provided with a prismatic inner surface 64 and a coating of semi-conductive material 66 on the opposite surface. The semi-conductive material is coated with silicone 68 as before to permit easy removal of grease or similar writing indications on this surface. In this embodiment, light may be reflected from either direction and, hence, the projection may be accomplished from either direction. The complete screen is light transmissive and a projected image will be highlighted within the screen.

Figure 9:
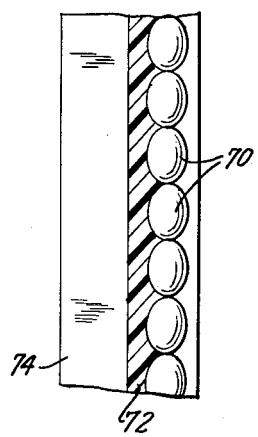

In FIG. 9, there is an embodiment of the glass bead arrangement shown in FIG. 6 in which glass beads 70 are joined together as by bonding with a thermosetting light transmissive plastic. The beads 70 are covered with a semi-conductive substance 72 on one face in order to provide heating therefor, and the left flat face of substance 72, as viewed in FIG. 9, is adapted to receive markings from a suitable writing instrument. A rectangular frame support 74 is provided along the edges and light may be directed for projection on the screen from either direction.

Figure 10:
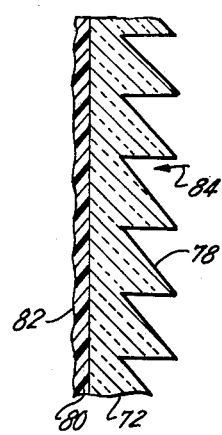

In FIG. 10 there is indicated a screen particularly adapted for daylight projection. This includes a lens member, such as a flat Fresnel-type lens 76 of glass or plastic having prisms 78 on one surface adapted to direct light into parallel directions on the opposite surface. The opposite surface includes a separate or integral thin layer of dark glass or plastic material 80 which includes a matted outer surface 82 arranged to diffuse light in all directions as it exits therefrom. When projection is made in the direction of the arrow 84 the image picked up on the screen is retained and highlighted on the screen. When a brilliant light, or even daylight, is directed in the area of the screen the projection image will still be maintained with high brilliance and little distortion.

Figure 11:
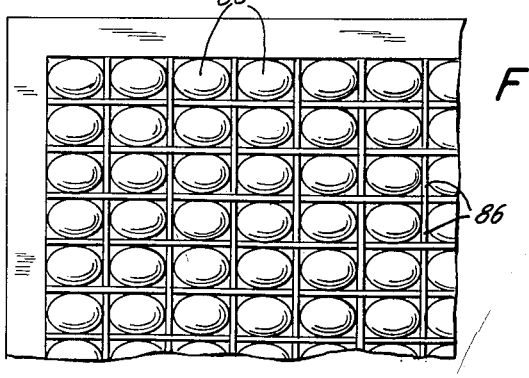
FIG. 11 is a fragmentary elevation similar to FIG. 3 of still another embodiment of the invention.

In FIG. 11 there is illustrated a manner of applying a conductive coating in a criss cross pattern 86 to provide sufficient heating for the screen 12 and still permit unhindered passage of light through the screen. The criss cross pattern 86 would be most advantageous with the embodiment illustrated in FIGS. 1 to 4 in which the light transmissive member includes semi-spherical reflective surfaces 88.

In some instances, it is desirable to employ a heating control switch 90 mounted on a bracket 92 at the side of the screen as illustrated in FIG. 1. After a person, such as a student, writes upon the face of the screen 12, the conductive coating 22 is energized, such as by actuating the switch 90. The switch advantageously includes a timing mechanism so that the heat will be applied to the screen 12 for a predetermined time and cause melting of the heat dissoluble material of the writing instrument and effect its running down into the collecting trough 14. The trough 14 is of inexpensive construction, such as cardboard, and is discarded after it has collected a sufficient amount of the writing material. In some instances, it is desirable to provide a permanent trough 14 having heating elements to aid in the flow of grease and its eventual removal from the trough through an opening which would be provided in the trough.

Thus, the invention provides a projection screen which permits high quality rear or front projection of images and which also permits its use as a writing board. A student may freely write and indicate on the screen and the writing may be removed by merely heating the screen to cause the grease of the indication to run downwardly into the collecting trough.

While specific embodiments of the invention have been shown and described in detail to illustrate the application of the invention principles, it will be understood that the invention may be embodied otherwise without departing from such principles.

What is claimed is:

1. A projection screen including a transparent assembly for receiving heat-meltable written indications thereon, said assembly having a reflective panel and means to heat said assembly whereby to remove heat-meltable written indications thereon.

2. A combination projection screen and writing board comprising a transparent assembly for receiving heat-meltable writing thereon, said assembly having a reflective panel and means to uniformly heat the assembly to erase heat-meltable writing therefrom.

3. A combination projection screen and writing board comprising a light transmissive screen portion including an outer surface for writing thereon with heat meltable material, an inner highly reflective surface, a semi-conductive material between said inner and outer surfaces, and means to energize said semi-conductive material whereby to heat said outer surface for removal by melting of said writing.

4. A combination projection screen and writing board according to claim 3, wherein said light transmissive screen portion includes a heat resistant plastic material having said outer surface.

5. A combination projection screen and writing board according to claim 3, wherein said inner reflective surface includes a plurality of rows of convex inner surfaces covered with a highly reflective material.

6. A combination projection screen and writing board according to claim 3, wherein said inner reflective surface includes a plurality of rows of prisms defined thereon.

7. A combination projection screen and writing board according to claim 6, wherein said prisms are sloped to direct light in a predetermined manner.

8. A combination projection screen and writing board according to claim 3, wherein said inner surface includes a multiplicity of small light transmitting beads mounted on a highly reflective sheet.

9. A combination projection screen and writing board according to claim 3, wherein said light transmissive screen portion includes a glass member having said outer surface.

10. A combination projection screen and writing board according to claim 3, wherein said inner reflective surface includes a multiplicity of hemi-spherical recesses defined thereon.

11. A combination projection screen and writing board comprising a screen portion including a multiplicity of interconnected small size light transmissive beads, a semi-conductive material coating on one side of said beads, and a silicone coating on said semi-conductive coating.

12. A combination projection screen and writing board comprising a screen portion including a light transmissive material having a reflective surface on one side, a coating of semi-conductive material on the opposite side of said light transmissive material and means to energize said semi-conductive material whereby to heat said light transmissive surface.

13. A combination projection screen and writing board according to claim 12, including a silicone coating on said semi-conductive surface.

14. A combination projection screen and writing board according to claim 12, wherein said light transmissive member includes a multiplicity of prisms on a face thereof.

15. A combination projection screen and writing board according to claim 12, wherein said light transmissive member includes a multiplicity of hemi-spherical recesses defined on a face thereof.

16. A combination projection screen and writing board according to claim 12, including a frame support and wherein said light transmissive member comprises a multiplicity of interconnected beads and a white cloth surface holding said beads.

17. A daylight projection screen comprising a member with a face having prisms thereon arranged to direct light incident thereon into parallel directions, a matted dark surface defined on said member on the face opposite said light directing prisms whereby to diffuse light exiting therefrom, and heating means operatively connected to said member for heating the same to remove heat-meltable writing therefrom.

18. A daylight projection screen according to claim 17, wherein said face having prisms thereon is a clear plastic Fresnel-type lens.

19. A daylight projection screen comprising an assembly having a Fresnel lens having a plurality of prisms on one surface thereof arranged to direct light incident thereon into parallel directions and a thin dark layer of translucent material bonded to said Fresnel lens, said thin dark layer of translucent material including a matted outer surface to diffuse light which exits therefrom, and heating means operatively connected to said assembly for heating the same to remove heat-meltable writing therefrom.

References Cited in the file of this patent

UNITED STATES PATENTS

| | | |
|---|---|---|
| 1,227,205 | Sartakoff | May 22, 1917 |
| 1,399,566 | Lazarus | Dec. 6, 1921 |
| 1,688,672 | Thompson | Oct. 23, 1928 |
| 2,036,146 | Kampfer | Mar. 31, 1936 |
| 2,234,950 | Barclay | Mar. 18, 1941 |
| 2,279,555 | Browne et al. | Apr. 14, 1942 |
| 2,510,344 | Law | June 6, 1950 |
| 2,673,142 | Glynn | Mar. 23, 1954 |
| 2,761,945 | Colbert et al. | Sept. 4, 1956 |
| 2,971,277 | Vaillancourt | Feb. 14, 1961 |

FOREIGN PATENTS

| | | |
|---|---|---|
| 1,052,988 | France | Sept. 30, 1953 |
| 596,813 | Great Britain | Jan. 12, 1948 |